Patented Apr. 10, 1945

2,373,570

UNITED STATES PATENT OFFICE 2,373,570

NONCORROSIVE LIQUIDS

Edwin Hastings Keller, Wawa, Pa., assignor to E. I. du Pont de Nemours & Company, Wilmington, Del., a corporation of Delaware No Drawing. Application August 21, 1943, Serial No. 499,545

13 Claims. (Cl. 252—75)

This invention relates to noncorrosive liquids for use in heat exchange devices and the like, and particularly antifreeze and cooling solutions for automobile and aircraft engines.

Aqueous solutions of alcohols are commonly employed as the liquids in heat exchange devices, particularly in automobile radiators. It is known that these solutions usually contain added agents which tend to inhibit the corrosive effect of the solutions on metals. Calcott and Walker have disclosed in U. S. Patent 1,797,401 that a composition suitable for use as a corrosion inhibitor for iron and copper may contain aqueous alcohol, a soluble amino carboxylic acid derivative, and mercaptobenzothiazole. In U. S. Patent 1,911,195, Kepfer disclosed that methanolic antifreeze solutions may contain borax as an agent to inhibit the corrosion of metallic surfaces. While these anticorrosion agents have been highly effective in inhibiting attack on metals by antifreeze solutions, it has nevertheless been obobserved that after a sufficiently protracted period of use, the effectiveness of corrosion inhibitors in such compositions tends to decrease. This can be detected by measurement of the hydrogen ion concentration of an antifreeze composition over a long period of use. Ultimately the pH of the mixture gets below 6.5 and 7.0 and measurable corrosion of the metal surfaces commences. Furthermore, when such antifreeze solutions are used in combination with water containing appreciable amounts of soluble chloride, corrosion frequently occurs.

An object of this invention is to provide a new antifreeze composition which remains noncorrosive even after prolonged use. Another object is to provide a process for inhibiting the corrosion of metals particularly oxidizable metals, in contact with antifreeze solutions in the cooling systems of internal combustion engines. Still another object is to provide a new antifreeze composition which, when dissolved in water containing appreciable amounts of soluble chloride, forms a solution which remains relatively noncorrosive throughout a prolonged period of use.

In accordance with the present invention, these objects are accomplished by the use of a mixture of inhibitors, which if applied in antifreeze compositions individually could not provide the desired degree of inhibition. I have discovered that the development of corrosiveness in antifreeze mixtures which contain borax can be slowed up in a surprising degree by having present in the mixture a small amount of a mercaptobenzothiazole compound, by which is meant mercaptobenzothiazole or an alkali metal salt thereof. Thus I have found that considerably improved antifreeze compositions comprise aqueous alcoholic solutions containing borax and a mercaptobenzothiazole compound. These improved antifreeze compositions have the property of retaining their anticorrosive properties for longer periods of use than corresponding compositions containing either borax in the absence of the mercaptobenzothiazole compound or the mercaptobenzothiazole compound in the absence of borax.

The alcohols which may be used in the present invention include ethylene glycol, propylene glycol, 1,3-butylene glycol, mixtures of these glycols, methanol, ethanol isopropanol, glycerol and the like.

An important embodiment of this invention is in the re-inhibition of methanol, ethanol or ethylene glycol antifreeze solutions which have become corrosive after prolonged use, or in which the hydrogen ion concentration and reserve alkalinity, as hereinafter defined, has drifted to a level at which corrosiveness is imminent. Thus, according to this invention, borax and mercaptobenzothiazole or its alkali metal salt may be added periodically to the liquid coolant in an automobile or aircraft engine, and corrosion of the metals in contact with the coolant is thereby inhibited. Furthermore, mercaptobenzothiazole or its alkaline metal salt may be added periodically to a borax-containing antifreeze solution which has been in use in an engine cooling system, to inhibit corrosion of the metals exposed to the antifreeze solution.

Among the metals which are protected by the herein disclosed antifreeze solutions are aluminum, iron, steel, copper, brass, solder, and the like.

The following examples will serve to illustrate my invention in greater detail. In the examples and in the claims the quantities of the various ingredients are expressed in terms of parts by weight.

EXAMPLE I

Test strips of metals one inch long, 0.375 inch wide and 0.0625 inch thick were heated in various antifreeze mixtures as shown in the following tables. The temperature in each test was maintained at 160° F. The duration of each test is given in the tables. Table I shows the reinhibition of a solution of commercial ethylene glycol antifreeze which had been used in an automobile engine cooling system through one season. Table II shows the inhibition of a fresh ethylene glycol antifreeze mixture containing a relatively small amount of soluble chloride. Table III shows the inhibition of a fresh ethylene glycol antifreeze mixture containing a relatively large amount of soluble chloride.

TABLE I

*Tests on reinhibiting ethylene glycol antifreeze*

[Time of test 168 hours, temperature 160° F.]

| 33% solution in water | Per cent weight change | | | | |
|---|---|---|---|---|---|
| | Aluminum | Iron | Copper | Brass | Solder |
| Used antifreeze solution | −.17 | −2.36 | +.04 | +.04 | −.46 |
| Used antifreeze soln. .94% borax | −.71 | −.03 | −1.65 | −.60 | −.48 |
| Used antifreeze soln. .94% borax, .04% MBT (mercaptobenzothiazole) | −.14 | +.04 | +.17 | +.27 | +.03 |

TABLE II

*Tests on inhibiting fresh ethylene glycol antifreeze solution in low chloride content water (15 parts per million)*

[Time of tests 504 hours, temperature 160° F.]

| 33% solution in water | Per cent weight change | | | | |
|---|---|---|---|---|---|
| | Aluminum | Iron | Copper | Brass | Solder |
| Glycol, 2.5% borax | −.08 | −.15 | −.60 | 0 | −.12 |
| Glycol, 2.5% borax, 0.1% MBT | +.02 | −.05 | +.01 | +.07 | −.02 |

TABLE III

*Tests on inhibiting fresh ethylene glycol antifreeze in high chloride content water (500 parts per million chloride)*

[Time of tests 312 hours, temperature 160° F.]

| 33% solution in water | Per cent weight change | | | | |
|---|---|---|---|---|---|
| | Aluminum | Iron | Copper | Brass | Solder |
| Glycol, 2.5% borax | −1.77 | −5.90 | −.23 | −.09 | −.24 |
| Glycol, 2.5% borax 0.1% MBT | −.16 | −.11 | −.02 | +.01 | −.30 |

Example 2

A mixture containing 33 parts of ethylene glycol, 67 parts of water and 0.85 part of borax was circulated through the cooling system of an internal combustion engine for 1248 hours at 160° F. The reserve alkalinity of the solution initially was 45, and at the end of the test was 40. Reserve alkalinity is the number of cubic centimeters of 0.1 normal acid required to neutralize 100 cubic centimeters of the coolant.

In this test, in order to simulate conditions under which corrosion of oxidizable metals is frequently encountered in automotive engine cooling systems containing antifreeze compositions, a controlled quantity of air (0.1 cu. ft. per hr. per gal. cooling system capacity) was admitted at the suction side of the circulating pump. This air was drawn into the coolant, and was allowed to pass through the radiator with the coolant.

In a parallel test with the same rate of air flow into the coolant, a mixture containing 33 parts of ethylene glycol, 67 parts of water, 0.85 part of borax and 0.033 part of mercaptobenzothiazole was circulated through the engine cooling system for 1632 hours at 160° F. The reserve alkalinity of the solution initially was 44 and at the end of the test was still 44.

The two tests in Example 2 showed that in actual use the solution containing both borax and mercaptobenzothiazole retained a constant alkalinity, whereas the solution which contained the borax but not the mercaptobenzothiazole exhibited a definite decrease in alkalinity over the period of the test. Examination of the metal parts exposed to the solutions in these tests confirmed the results of the tests. The surface of the steel circulating pump which had been in contact with the solution containing borax and mercaptobenzothiazole during the test became visibly less corroded than did the corresponding surface of the steel circulating pump which had been in contact with the solution containing borax but no mercaptobenzothiazole during the test.

The quantity of borax which I may use in an aqueous ethylene glycol or other alcoholic antifreeze may be from 0.0001 to 0.050 part of borax per part of alcohol, preferably from 0.01 to 0.05 part, per part of alcohol. I may use from 0.01 to 0.1 part, preferably from .02 to 0.05 part, of the mercaptobenzothiazole compound per part of borax. The compositions may contain water and the alcohol in any proportion, but preferably the weight of alcohol is between 0.10 and 2.5 times the weight of the water.

In the reinhibition of used (i. e., actually used as a coolant, or stored for a prolonged period of time) antifreeze composition by borax and the mercaptobenzothiazole compound, either of these inhibitors, or both together, may be added to the antifreeze composition in powder form or in the form of a solution, suitably a solution in water or a water miscible organic solvent, such as methanol, ethylene glycol or isopropanol. While mercaptobenzothiazole and its sodium salts are both highly effective in these reinhibition mixtures, the sodium salt has the advantage of being more readily soluble in water.

I claim:

1. A process for inhibiting the corrosion of the metals which come in contact with alcoholic antifreeze solutions which comprises contacting the metal with the antifreeze composition containing an alcohol, borax and a mercaptobenzothiazole compound.

2. A process for inhibiting the corrosion of the metals which come in contact with antifreeze solutions which comprises contacting the metals with the antifreeze composition containing ethylene glycol, borax and a mercaptobenzothiazole compound.

3. A process for inhibiting the corrosion of the metals which come in contact with antifreeze solutions which comprise contacting the metal with the antifreeze composition containing 10% to 100% ethylene glycol, 0.01% to 5.0% borax, and 0.0001% to .5% mercaptobenzothiazole.

4. An antifreeze composition which is substantially noncorrosive toward the metals of an internal combustion engine, and which remains noncorrosive for a prolonged period of use, which consists essentially of a water-soluble alcohol as the chief non-aqueous ingredient, and a mixed inhibitor of borax and a mercaptobenzothiazole compound.

5. An antifreeze composition which is substantially noncorrosive towards the metals of an internal combustion engine, and which remains noncorrosive for a prolonged period of use, which consists essentially of ethylene glycol as the chief non-aqueous ingredient and a mixed inhibitor of borax and a mercaptobenzothiazole compound.

6. An antifreeze composition which is substantially noncorrosive towards the metals of an internal combustion engine, and which remains noncorrosive for a long period of use, which consists essentially of 10% to 100% ethylene glycol, 0.01% to 5% borax, and 0.0001% to .5% mercaptobenzothiazole in the absence of a substantial quantity of other non-aqueous ingredients.

7. A process for inhibiting the corrosion of the metals which come in contact with alcoholic antifreeze solutions which comprises contacting the metal with a mixture containing an alcohol and borax, and thereafter introducing a mercaptobenzothiazole compound.

8. A process for inhibiting the corrosion of the metals which come in contact with antifreeze solutions which comprises contacting the metal with the antifreeze composition consisting substantially of aqueous ethylene glycol and borax, and thereafter adding a mercaptobenzothiazole compound to the antifreeze composition.

9. A process for inhibiting the corrosion of oxidizable metals which come in contact with previously used antifreeze compositions which comprises contacting the metal with the antifreeze composition containing 10% to 100% ethylene glycol and 0.01% to 5.0% borax, and thereafter adding a mercaptobenzothiazole compound to the antifreeze composition.

10. A process for inhibiting the corrosion of metals which come in contact with antifreeze compositions which comprises contacting the metal with an alcohol-containing antifreeze composition and thereafter adding borax and a mercaptobenzothiazole compound to the antifreeze composition.

11. A process for inhibiting the corrosion of the oxidizable metals which come in contact with antifreeze compositions which comprises contacting the metal with ethylene glycol-containing antifreeze and thereafter adding borax and a mercaptobenzothiazole compound to the antifreeze solution.

12. A process for inhibiting the corrosion of oxidizable metals which come in contact with previously used antifreeze compositions which comprises contacting the metal with the antifreeze composition containing 10 to 100% ethylene glycol, and thereafter adding 0.0001 to 0.05 part by weight of borax and 0.000001 to 0.005 part of mercaptobenzothiazole per part of ethylene glycol present in the antifreeze composition.

13. An alcoholic antifreeze reinhibitor composition consisting chiefly of borax and mercaptobenzothiazole in the proportion of 0.01 to 0.10 part by weight of mercaptobenzothiazole per part of borax.

EDWIN HASTINGS KELLER.